US012811988B2

(12) United States Patent
Dubey et al.

(10) Patent No.: US 12,811,988 B2

(45) Date of Patent: Nov. 24, 2026

(54) MANAGING LOSS OF UE CONTEXT DURING IMS PROCEDURES

(71) Applicant: QUALCOMM Incorporated, San Diego, CA (US)

(72) Inventors: Avinash Kumar Dubey, Hyderabad (IN); Chandhu P S, Kottayam (IN); Naresh Gundu, Hyderabad (IN); Balaji Kannan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 18/403,370

(22) Filed: Jan. 3, 2024

(65) Prior Publication Data

US 2025/0220055 A1 Jul. 3, 2025

(51) Int. Cl.

| | |
|---|---|
| ***H04L 65/1016*** | (2022.01) |
| ***H04L 65/1045*** | (2022.01) |
| ***H04W 56/00*** | (2009.01) |
| ***H04W 60/04*** | (2009.01) |

(52) U.S. Cl.

CPC ...... *H04L 65/1016* (2013.01); *H04L 65/1045* (2022.05); *H04W 56/0045* (2013.01); *H04W 60/04* (2013.01)

(58) Field of Classification Search

CPC ............. H04L 65/1016; H04L 65/1045; H04L 65/1073; H04L 69/28; H04W 56/0045; H04W 60/04; H04W 76/18; H04W 76/19; H04W 76/38

See application file for complete search history.

(56) References Cited

U.S. PATENT DOCUMENTS 10,485,050 B2 11/2019 Chinthalapudi et al.
2010/0197307 A1* 8/2010 Horn .................... H04W 60/02 455/435.1

(Continued)

OTHER PUBLICATIONS

International Search Report and Written Opinion—PCT/US2024/060561—ISA/EPO—Mar. 31, 2025.

(Continued)

*Primary Examiner* — Diane D Mizrahi

(74) *Attorney, Agent, or Firm* — QUALCOMM Incorporated

(57) ABSTRACT

Certain aspects of the present disclosure provide techniques for managing loss of user equipment (UE) context information during internet protocol multimedia subsystem (IMS) procedures. An example method includes starting an internet protocol multimedia subsystem (IMS) procedure failure reset timer, transmitting, while the IMS Procedure Failure Reset Timer is running, one or more IMS session initiation protocol (SIP) messages to a network entity, detecting that the IMS Procedure Failure Reset Timer has expired without receiving an IMS response message from the network entity responding to the one or more IMS SIP messages, determining, in response to detecting that the IMS Procedure Failure Reset Timer has expired without receiving an IMS response message, that a synchronization timer associated with a connection between the UE and the network entity is running, and performing, based on the determination that the synchronization timer is running, a non-access stratum (NAS) procedure with the network entity.

28 Claims, 11 Drawing Sheets

(56) References Cited

U.S. PATENT DOCUMENTS

| | | | |
|---|---|---|---|
| 2022/0400360 | A1 | 12/2022 | Chiang |
| 2023/0047063 | A1 | 2/2023 | Kuppelur et al. |

OTHER PUBLICATIONS

3GPP: "3rd Generation Partnership Project, Technical Specification Group Core Network and Terminals, IMS Restoration Procedures (Release 16)", TS 23.380 V16.4.0, Jun. 29, 2021, pp. 1-57.

* cited by examiner

800

```
If (TA Timer == Infinity),
Sync_Timer = 5 Sec (or any threshold value);
Else
Sync_Timer = TA timer;
When UE moves to connected Mode,
Start Sync_Timer;
If (TA Timer received from NW),
Restart Sync_Timer;
If (UL/DL Grant received from NW),
Restart Sync_Timer;
If UE moves to Idle Mode and Sync timer still running,
Stop Sync_Timer;
```

FIG. 8

MANAGING LOSS OF UE CONTEXT DURING IMS PROCEDURES

BACKGROUND

Field of the Disclosure

Aspects of the present disclosure relate to wireless communications, and more particularly, to techniques for managing loss of UE context information during internet protocol multimedia subsystem (IMS) procedures.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes starting an internet protocol multimedia subsystem (IMS) registration timer; transmitting, while the IMS Procedure Failure Reset Timer is running, one or more IMS session initiation protocol (SIP) messages to a network entity; detecting that the IMS Procedure Failure Reset Timer has expired without receiving an IMS response message from the network entity responding to the one or more IMS SIP messages; determining, in response to detecting that the IMS Procedure Failure Reset Timer has expired without receiving an IMS response message, that a synchronization timer associated with a connection between the UE and the network entity is running; and performing, based on the determination that the synchronization timer is running, a non-access stratum (NAS) procedure with the network entity.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 illustrates an example algorithm for operating a synchronization timer.

DETAILED DESCRIPTION

Figure 1:
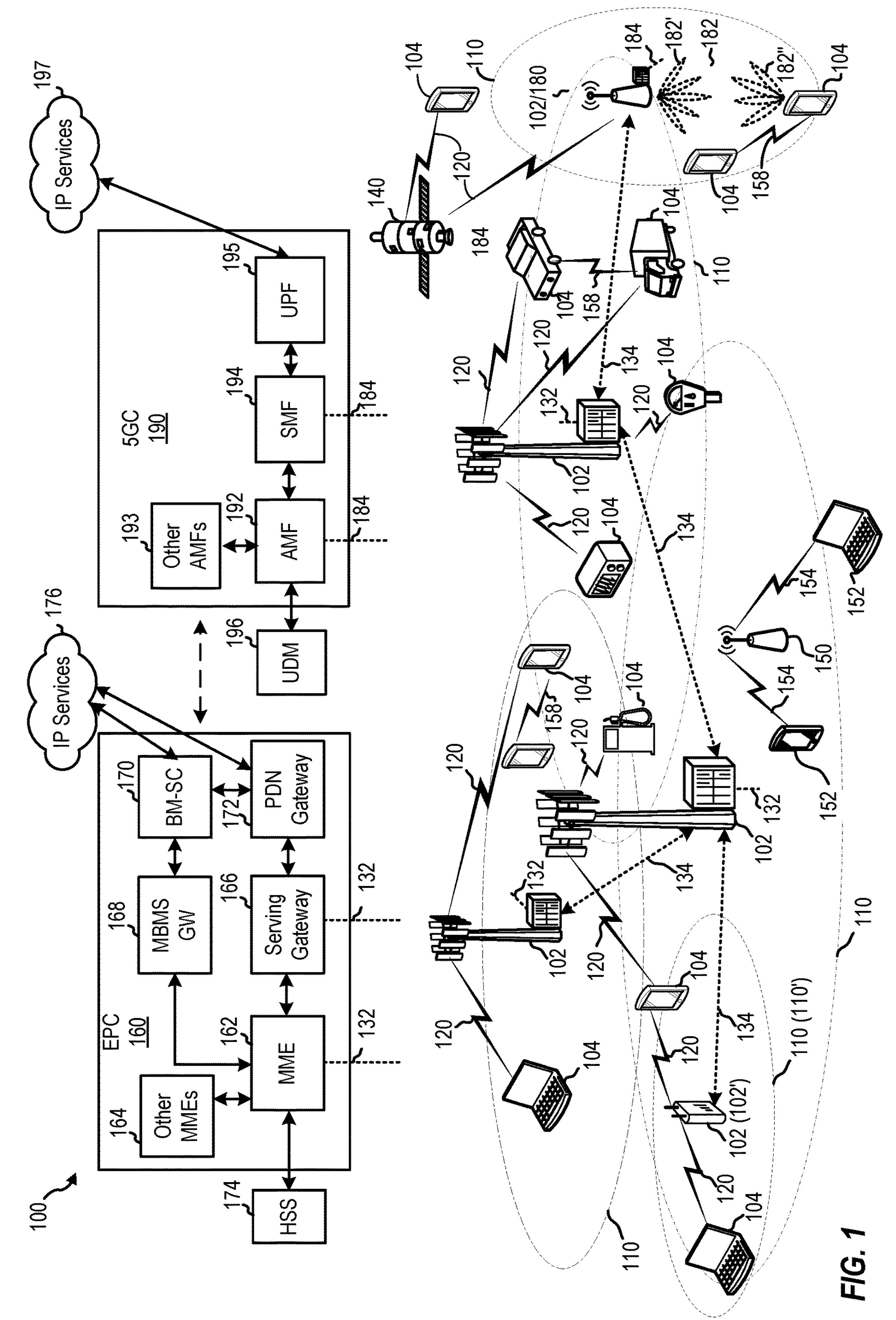
FIG. 1 depicts an example wireless communications network.

Aspects of the present disclosure provide apparatuses, methods, processing systems, and computer-readable mediums for managing loss of UE context information during internet protocol multimedia subsystem (IMS) procedures.

For example, in some cases, a user equipment (UE) may perform an attach procedure with a network entity (e.g., a base station, gNodeB, eNodeB, etc.) to establish a connection between the UE and the network entity. When performing the attach procedure, a core network entity (e.g., Mobility Management Entity (MME)) associated with the network entity may generate UE context information for the UE, including information such an identity of the UE, a location of the UE, capabilities of the UE, etc. Once the connection has been established, the UE may thereafter perform an IMS registration procedure to enable the multimedia communication services (e.g., internet, applications, etc.) over an internet protocol (IP) network. The IMS registration procedure involves the UE transmitting an IMS session initiation protocol (SIP) message to the IMS server and receiving an IMS response message from the IMS server via the network entity responding to the IMS SIP message.

In some cases, an ability of the UE to receive the IMS response message from the IMS server via the network entity may be based on the UE context information stored at the core network entity. For example, the core network entity may receive the IMS response message from the IMS server and may use the UE context information to determine the correct UE to forward the IMS response message to. However, in some cases, due certain issues at the core network entity, the core network entity may lose the UE context information for the UE, preventing the UE from receiving the IMS response message altogether.

When the UE does not receive the IMS response message responding to a previous IMS SIP message, the UE may transmit another IMS SIP message after a particular amount of time after transmitting the previous IMS SIP message. However, because there are issues with the UE context information, the UE again does not receive an IMS response message from the IMS server/network entity. As a result, the UE may repeats the process of transmitting IMS SIP messages at increasing intervals and not receiving IMS response messages until the network entity eventually drops the connection between the UE and the network entity. However, this process takes a significant amount of time (e.g., 5 or more minutes) and consumes a significant amount of power resources at the UE 504.

Accordingly, aspects of the present disclosure provide techniques for reducing an impact of UE context loss at a wireless network during an IMS procedure (e.g., IMS registration procedure or another type of IMS procedure), such as reducing the amount of time and power consumption needed to complete the IMS procedure in such scenarios. In some cases, these techniques may involve a UE proactively performing a NAS procedure when a synchronization timer associated with a connection between the UE and a network entity is running (e.g., indicating that the connection with the network entity is still active) and when an IMS response message, responding to an IMS SIP message transmitted by the UE, has not been received prior to expiration of an IMS Procedure Failure Reset Timer. By proactively performing the NAS procedure, the UE may be able to force reestablishment of the UE context for the UE, allowing the UE to again receive IMS response messages and reducing the amount of time and power consumption needed to complete the IMS procedure.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
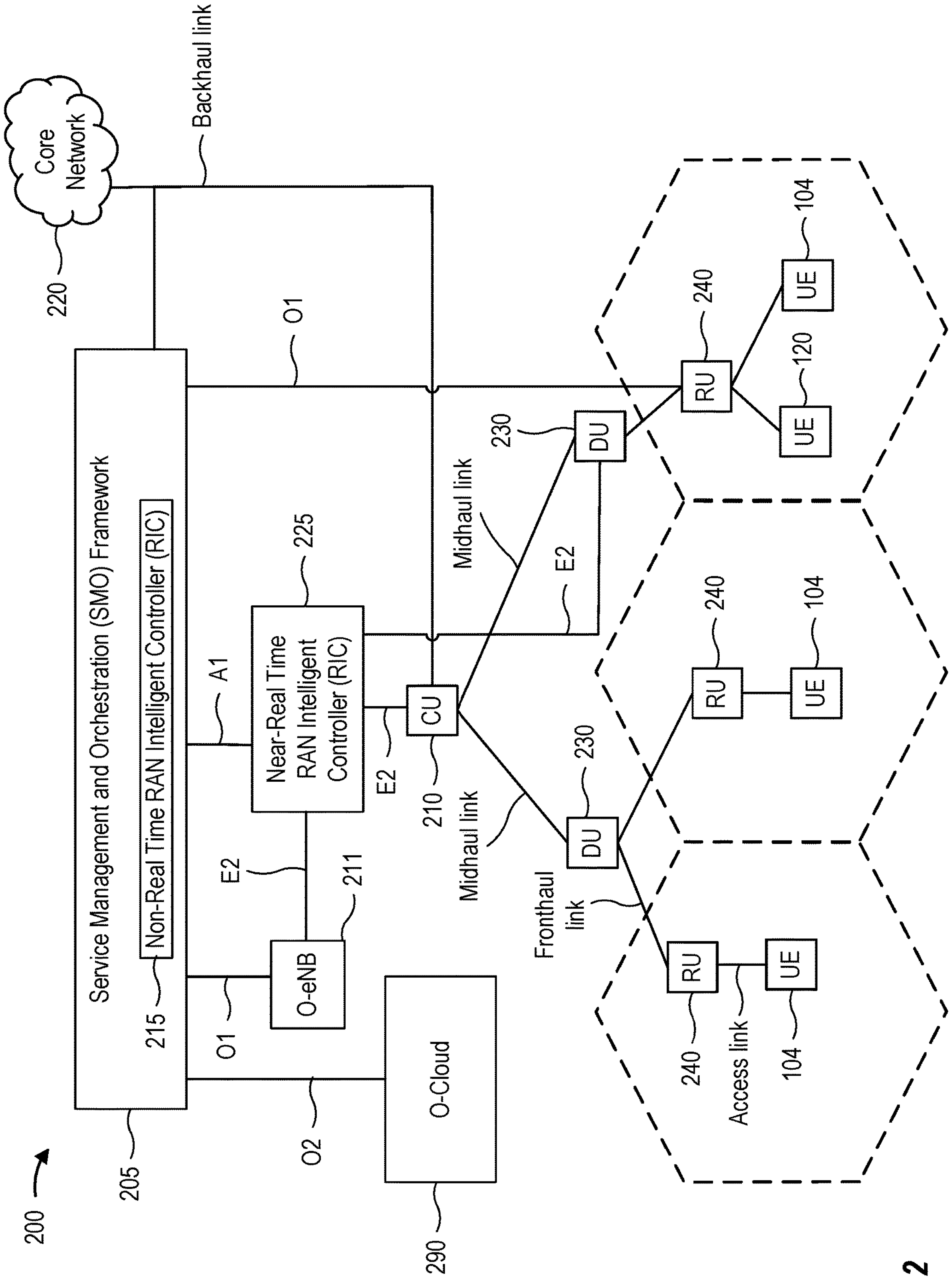
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182''. UE 104 may also transmit a beamformed signal to the BS 180 in one or more transmit directions 182''. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
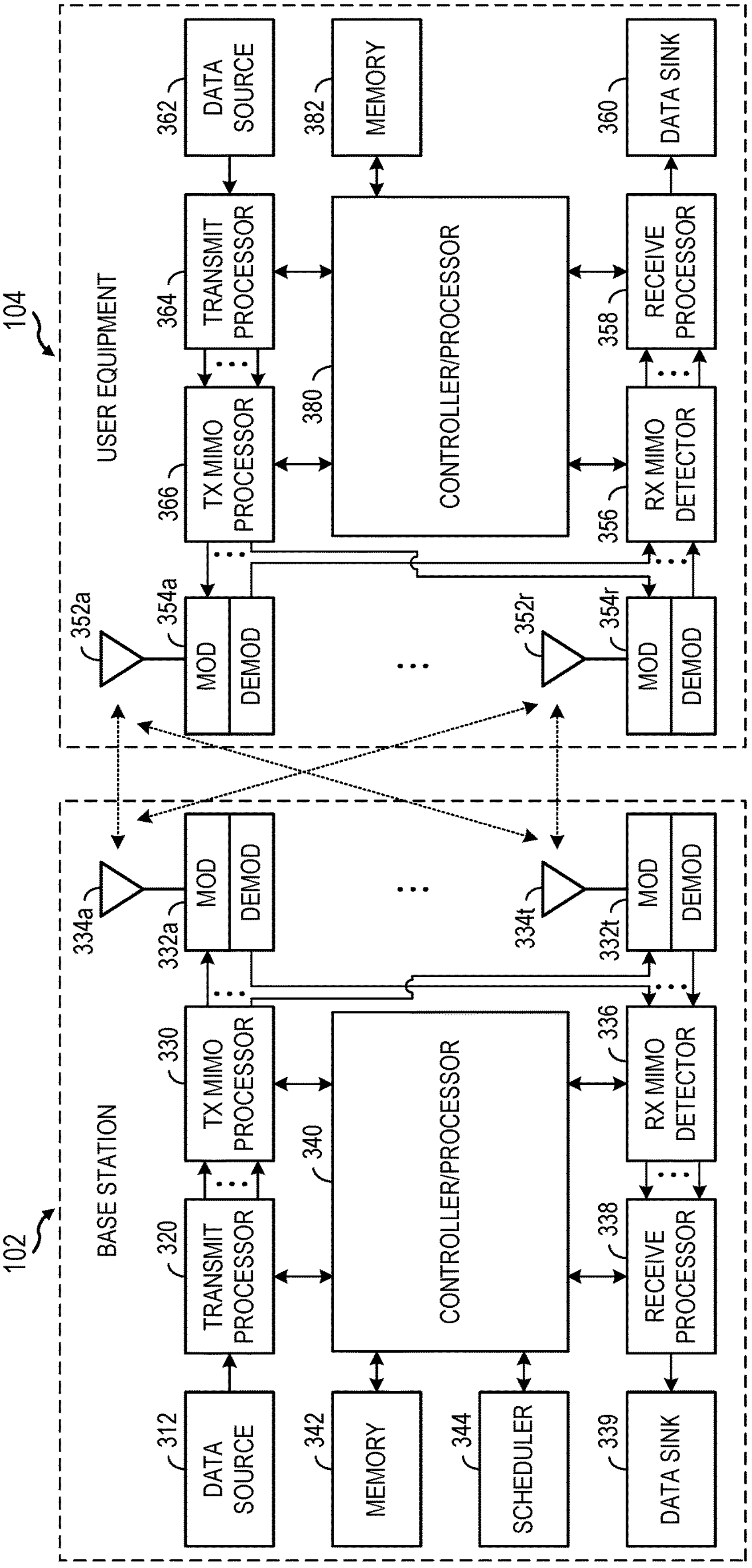
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
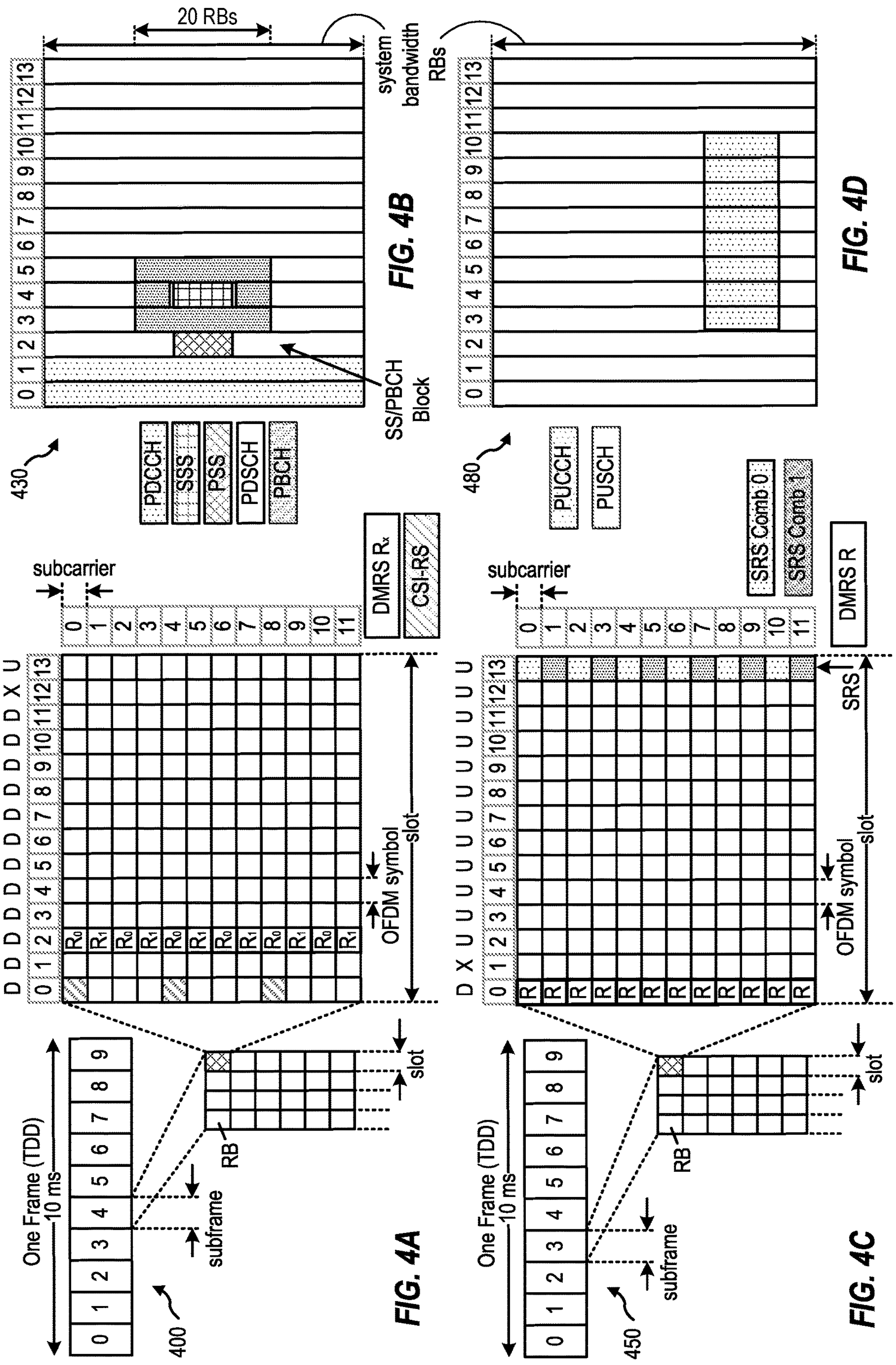
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram

450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to 24×15 kHz, where u is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Managing Loss of UE Context during IMS Procedures

Figure 5:
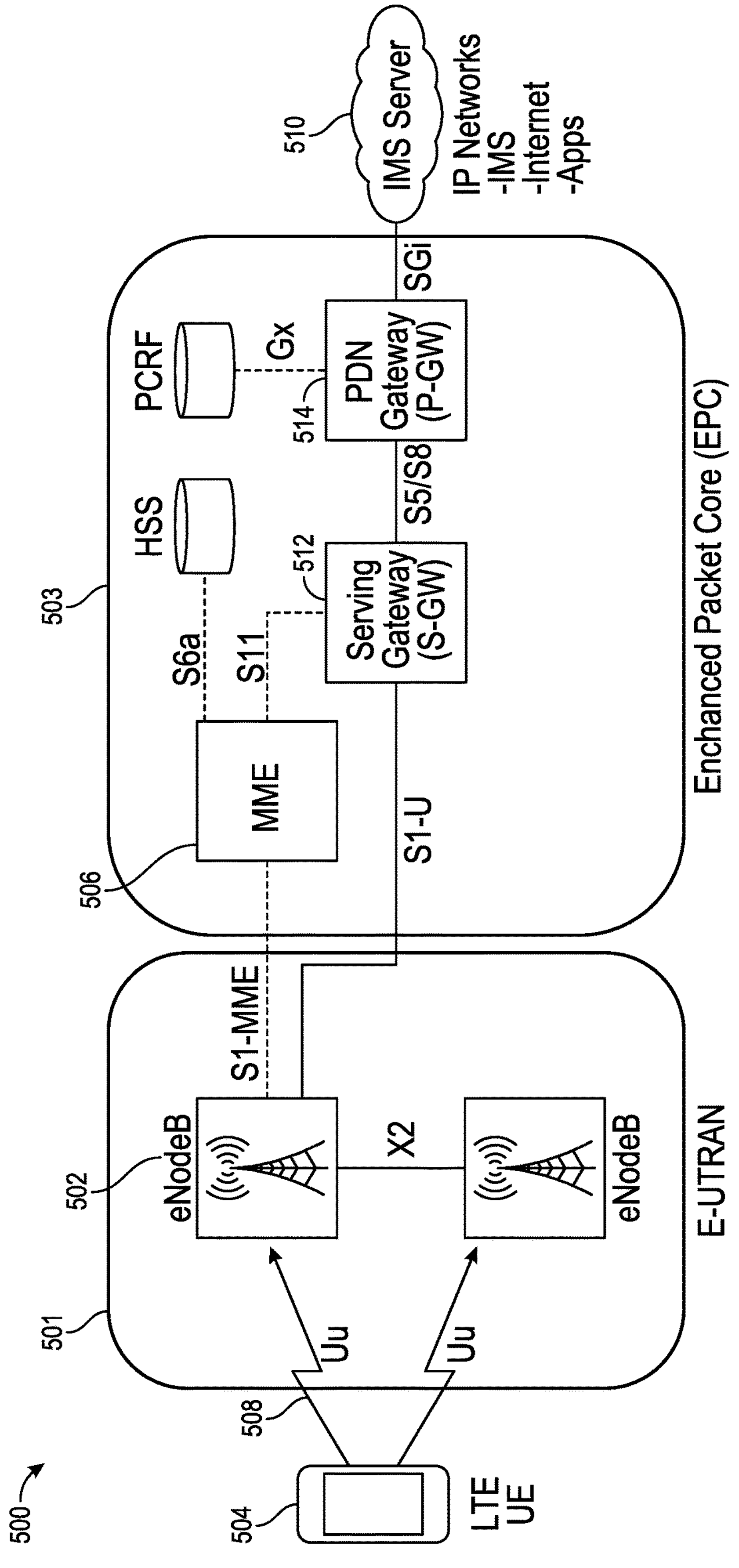
FIG. 5 illustrates a wireless network including a radio access network (RAN) and a core network.

FIG. 5. illustrates a wireless network 500 including a radio access network (RAN) 501 and a core network 503. As shown, the RAN 501 includes one or more eNodeBs, such as eNodeB 502, which serves as an intermediary and manages a radio interface between a UE 504 and the core network 503. Further, as shown, the core network 503 includes a number of other network entities, such as a Mobility Management Entity (MME) 506, serving gateway (S-GW) 512 and packet data network gateway (P-GW) 514, which may be configured to manage critical functions of the wireless network 500 including data routing and switching, managing communication sessions, providing connectivity to external networks, and coordinating mobility and location management.

The UE 504 establish a connection with the wireless network 500 by initiating an attach procedure. In some cases, the attach procedure may begin when a UE 504 enters a coverage area of the wireless network 500 or is powered on. Initially, the UE 504 may send an attach request to the wireless network 500 via the eNodeB 502 in the RAN 501, providing essential details about an identity and capabilities of the UE 504.

Thereafter, the attach request may be provided to the MME 506 in the core network 503 of the wireless network 500. The MME 506 may then perform authentication and security checks based on the attach request to ensure the identity of the UE 504 and establish a secure connection. Once authenticated, the MME 506 assigns temporary identities to the UE 504 and establishes a UE context for the UE 504, storing pertinent information about the identity of the UE 504, a location of the UE 504, capabilities of the UE 504, and security in both the MME 506 and the eNodeB 502. As part of the procedure, the MME also assigns an IP address to the UE, enabling it to communicate over the wireless network and access services. Additionally, location information of the UE 504 may be updated in tracking area and mobility management databases of the wireless network 500.

Once attached to the wireless network 500, the UE 504 may communicate with the wireless network 500 using a combination of different types of signaling, such as access stratum (AS) signaling and non-access stratum (NAS) signaling. AS signaling may be used by one or more functional layers of the UE 504, such as an AS layer or radio resource control (RRC) layer, to manage a radio interface and communication between the UE 504 and RAN 501, including the establishment, maintenance, and termination of radio bearers. In contrast, NAS signaling may be used by a NAS layer of the UE 504 to manage communication between the UE 504 and the core network 503, including functions such as session management, mobility management, and connection management.

Another type of signaling may include internet protocol (IP) multimedia subsystem (IMS)-based signaling for multimedia communication over IP networks. In some cases, an IMS layer of the UE 504 may initiate an IMS registration process to enable the multimedia communication services over the IP networks after attaching to the wireless network 500. To initiate IMS registration, the IMS layer of the UE 504 may send a session initiation protocol (SIP) REGISTER message containing user identity and location information to an IMS server. More specifically, for example, as shown in the FIG. 5 the UE 104 may transmit a SIP REGISTER message 508 on a Uu interface to the eNodeB 502. The eNodeB 502 may then forward the SIP REGISTER message 508 to an IMS server 510 via S-GW 512 and P-GW 514 in the wireless network 500. After arriving at the IMS server 510, the SIP REGISTER message 508 may then be processed for authentication and authorization. Upon successful authentication, the IMS server 510 may transmit a response message to the UE 504, assigning a destination IP address and temporary credentials to the UE 504, enabling secure communication with the IMS server 510 and allowing the UE 504 to access the multimedia communication services.

As noted above, during the attach procedure, the MME 506 may establish a UE context for the UE 504, including information related to the identity of the UE 504. In some cases, however, there may be scenarios in which, for various reasons, the MME 506 loses the UE context for the UE 504, leading to issues with the IMS registration process.

Figure 6:
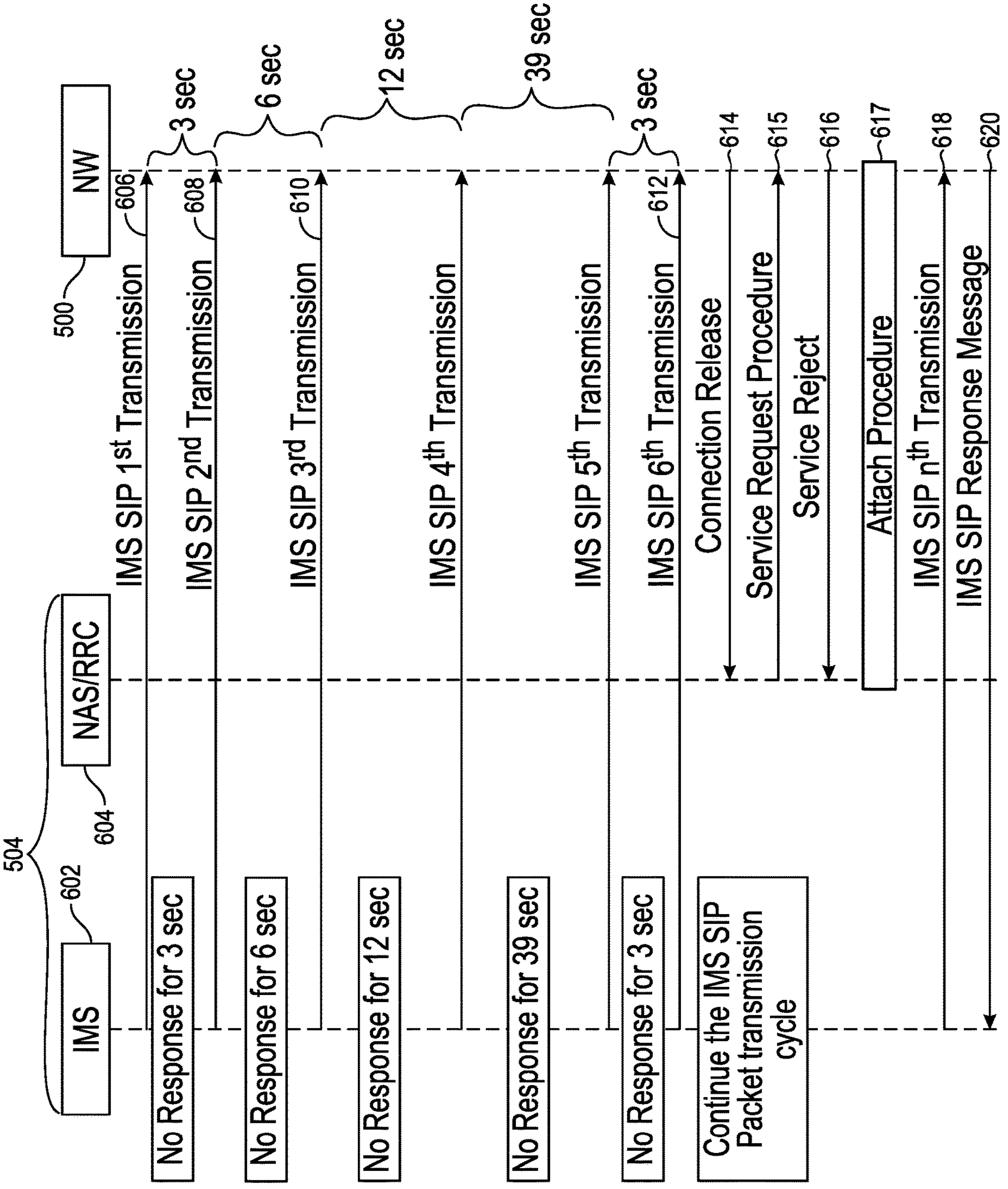
FIG. 6 illustrates an internet protocol multimedia subsystem (IMS) registration process call flow diagram.

FIG. 6 illustrates an IMS registration process call flow diagram including operations 600 demonstrating an issue that may arise in the IMS registration process when the UE context of the UE 504 is lost by the MME 506. As shown, operations 600 begin at 606 with an IMS layer 602 of the UE 504 sending a first IMS SIP transmission to the wireless network 500. As described above, the first IMS SIP transmission may be forwarded to an IMS server, such as the IMS server 510. Normally, the IMS server 510 would process the first IMS SIP transmission and send a response message to the UE 504, responding to the first IMS SIP transmission. However, in some cases, as noted above, the MME 506 of the wireless network 500 may lose the UE context for the UE 504, including an identity of the UE 504. In such cases, because the UE context for the UE 504 has been lost by the MME 506, UE 504 may not be able to receive the response message from the IMS server.

Because the IMS layer 602 of the UE 504 does not receive the response message from the IMS server 510, the IMS layer 602 may continue to transmit additional IMS SIP transmissions, each at increasing amounts of time therebetween. For example, as shown, when the IMS layer 602 does not receive the response message for the first IMS SIP transmission, the IMS layer 602 may send a second IMS SIP transmission 3 seconds after the first IMS SIP transmission, as shown at 608. When the IMS layer 602 does not receive a response message for the second IMS SIP transmission, the IMS layer 602 may then send a third IMS SIP transmission 6 seconds after the second IMS SIP transmission, as shown at 610. This process continues with the time between IMS SIP transmissions eventually increasing to 39 seconds, at which point the time between IMS SIP transmissions resets back to 3 seconds, as shown at 612 with a sixth IMS SIP transmission. This cycle may repeat itself until the wireless network 500 determines that there is no other data activity associated with the UE 504 and, as a result, releases an established connection with the UE 504, as shown at 614.

When the connection between the UE 504 and wireless network 500 is released, the UE 504 may still continue to try to send IMS SIP transmissions. However, because the connection has been released, a NAS/RRC layer(s) 604 may trigger a service request procedure at 615, which may be rejected by the wireless network 500 at 616. Thereafter, in response to the rejected service request procedure, the NAS/RRC layer(s) 604 may trigger another attach procedure with the wireless network 500 at 617, which reestablishes the UE context for the UE 504 at the MME 506. At this point in time, because the UE context has been reestablished, the IMS layer 602 may transmit an $n^{th}$ IMS SIP transmission to the IMS server 510 at 618 and finally receives a response message from the IMS server 510 at 620 as the MME 506 is able to determine the intended recipient of the response message and to forward the response message from the IMS server 510 to the UE 504. While the UE 504 is able to finally receive the response message at 620 in operations 600, this process takes a significant amount of time (e.g., 5 or more minutes) and consumes a significant amount of power resources at the UE 504.

Accordingly, aspects of the present disclosure provide techniques for reducing an impact of UE context loss at a wireless network during an IMS procedure (e.g., IMS registration procedure or another type of IMS procedure), such as reducing the amount of time and power consumption needed to complete the IMS procedure in such scenarios. In some cases, these techniques may involve a UE proactively performing a NAS procedure when a synchronization timer associated with a connection between the UE and a network entity is running (e.g., indicating that the connection with the network entity is still active) and when an IMS response message, responding to an IMS SIP message transmitted by the UE, has not been received prior to expiration of an IMS Procedure Failure Reset Timer. By proactively performing the NAS procedure, the UE may be able to force reestablishment of the UE context for the UE, allowing the UE to again receive IMS response messages and reducing the amount of time and power consumption needed to complete the IMS procedure.

Example Operations of Entities in a Communications Network

Figure 7A:
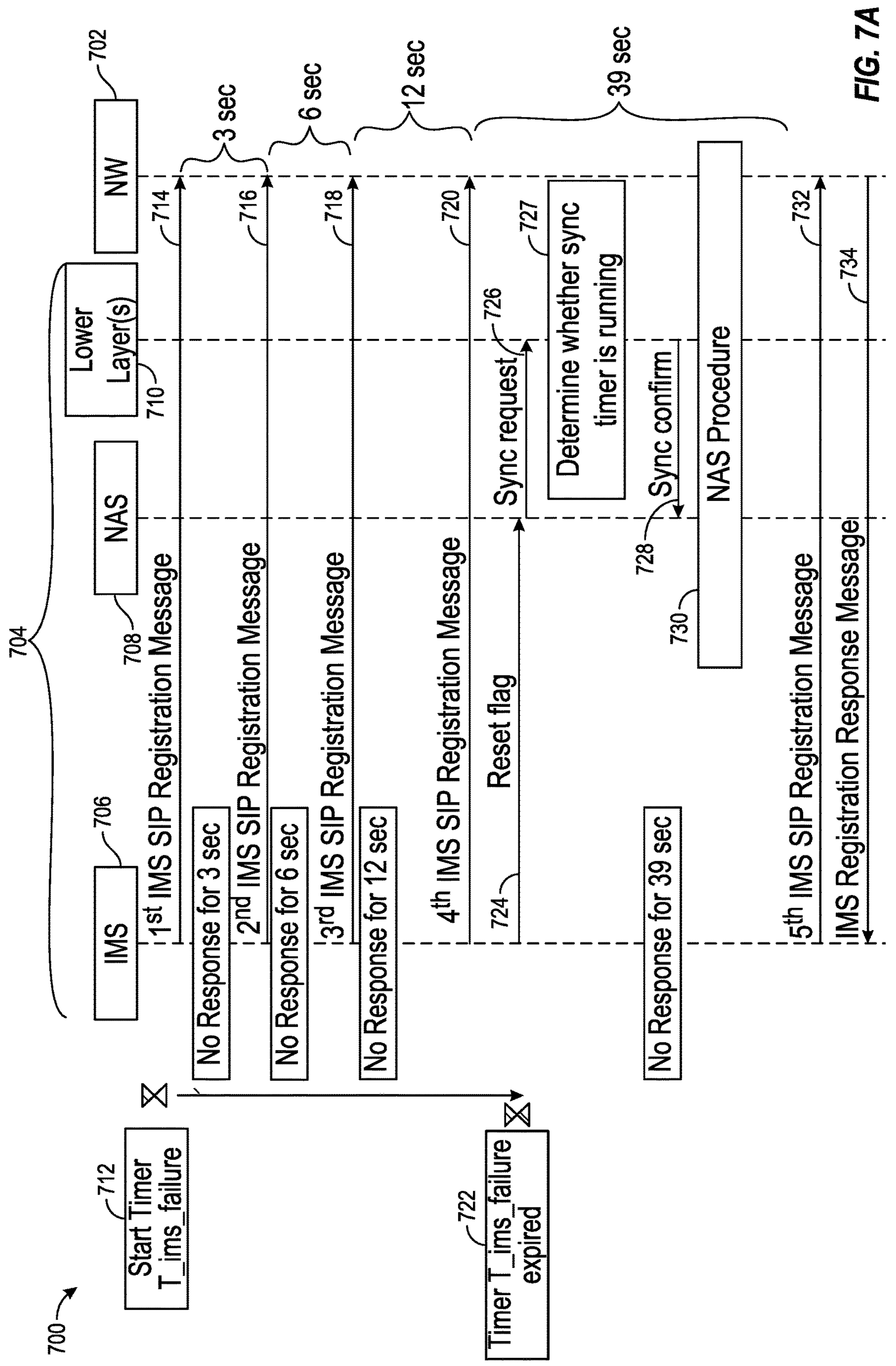
FIG. 7A depicts a process flow for communications in a network between a network entity and a user equipment.

FIG. 7A depicts a process flow including operations 700 for communications in a network between a network entity 702 and a user equipment (UE) 704 for managing UE context loss during an IMS procedure, such as an IMS registration procedure. While the aspects presented below provide techniques for managing UE context loss during an IMS registration procedure, similar techniques may be applied to other IMS procedures. As shown, UE 704 includes a number of functional layers, such as an IMS layer 706, a NAS layer 708, and an one or lower layers 710 (e.g., AS layers), which may be configured to perform various aspects of the operations 700, as described in greater detail below. While the one or more lower layers 710 are illustrated as being a single layer, it should be understood that the one or more lower layers 710 may include a plurality of layers, such as a media access control (MAC) layer, a radio link control (RLC) layer, and/or a packet data convergence control (PDCP) layer. In some cases, the network entity 702 and the UE 704 may communicate with each other using a connection (e.g., a Uu connection) previously established based on an attach procedure performed between the network entity 702 and the UE 704.

In some aspects, the network entity 702 may be an example of the BS 102 depicted and described with respect to FIGS. 1 and 3 or a disaggregated base station depicted and described with respect to FIG. 2. Similarly, the UE 704 may be an example of UE 104 depicted and described with respect to FIGS. 1 and 3. However, in other aspects, UE 104 may be another type of wireless communications device and BS 102 may be another type of network entity or network node, such as those described herein.

As shown, operations 700 begin with the UE 704 initiating an IMS procedure, such as an IMS registration procedure, and starting an IMS Procedure Failure Reset Timer (e.g., T_ims_failure) at 712. Thereafter, at 714 while the IMS Procedure Failure Reset Timer is running, the UE 704 sends, from the IMS layer 706, a first IMS SIP message to the network entity 702, such as an IMS SIP registration message. While not shown in FIG. 7A, in some cases, the UE 704 may receive one or more acknowledgement messages from a radio access network (e.g, RAN 501) associated with the network entity 702 acknowledging reception of the first IMS SIP message. However, as shown, the UE 704 may not receive an IMS response message from the network entity 702 (e.g., from an IMS server via the network entity 702) responding to the first SIP message. In other words, while the UE 704 may receive an acknowledgement message from the network entity 702 that acknowledges reception of the first IMS SIP message, the UE 704 may not receive an IMS response message from the IMS server via the network entity 702 responding to the first IMS SIP message.

As noted above, the reason why the UE 704 may not receive the IMS response message from the network entity 702 may be due to the network entity 702 (e.g., an MME of the network entity 702) losing a UE context for the UE 704, preventing the network entity 702 from knowing that the IMS response message (e.g., that may be received by the network entity 702 from an IMS server) is intended for the UE 704.

After three seconds of not receiving the IMS response message from the network entity 702 responding to the first SIP message, the IMS layer 706 may transmit a second IMS SIP message at 716 while the IMS Procedure Failure Reset Timer is still running. As shown, the UE 704 may again not receive an IMS response message responding to the second IMS SIP message. After six seconds of not receiving the IMS response message responding to the second IMS SIP message, the IMS layer 706 of the UE 704 may then send a third IMS SIP message, as shown at 718. Similarly, as shown, the UE 704 may again not receive an IMS response message responding to the third IMS SIP message. After 12 seconds of not receiving the IMS response message responding to the third IMS SIP message, the IMS layer 706 of the UE 704 may then send a fourth IMS SIP message, as shown at 720.

At this point in time, the IMS layer 706 will wait another 39 second before transmitting a fifth IMS SIP message. However, during the period of time between the fourth IMS SIP message and the fifth IMS SIP message, the UE 704 may detect that the IMS Procedure Failure Reset Timer has expired without receiving a response message to at least the fourth IMS SIP message, as shown at 722. Thereafter, as shown at 724, based on detecting that the IMS Procedure Failure Reset Timer has expired without receiving an IMS response message from network entity, the UE 704 may send a reset flag from the IMS layer 706 of the UE 704 to the NAS layer 708 of the UE 704. In some cases, the reset flag may request the NAS layer 708 to reset or refresh the connection established between the network entity 702 and the UE 704 by performing a NAS procedure with the network entity 702 to reestablish the UE context for the UE 704.

Before performing the NAS procedure, the UE 704 may first determine whether the connection between the network entity 702 and the UE 704 is still active, which may be based on a synchronization timer associated with the connection between the network entity 702 and the UE 704. For example, as shown 726, the NAS layer 708 of the UE 704 may send a synchronization request (e.g., sync request) message to the one or more lower layers 710, inquiring whether the synchronization timer is running. As shown at 727, the UE 704 may determine, at the one or more lower layers 710, whether the synchronization timer is running.

In some cases, if the synchronization timer is running, this may indicate that the connection between the network entity 702 and the UE 704 is still active and functioning correctly. However, if the synchronization timer has expired, this may indicate that there is a problem with the connection between the network entity 702 and the UE 704. In some cases, the UE 704 may be configured to operate the synchronization timer (e.g., so that it does not prematurely expire) according to a particular algorithm.

FIG. 8 illustrates an example algorithm 800 for operating a synchronization timer. In some cases, the synchronization timer may be based on a value for a time alignment timer that is received from the network entity 702 during establishment of the connection between the network entity 702 and the UE 704. For example, in some cases, the UE 704 may receive configuration information from the network entity 702 indicating the value for the time alignment timer.

Accordingly, to operate the synchronization timer, as shown in line 1 of the algorithm 800, the UE 704 may first check whether the value for the time alignment timer is set to infinity. Thereafter, in line 2, if the value of the time alignment timer is set to infinity, the UE 704 may set a value for synchronization timer to a value less than infinity (e.g., 5 seconds or some other threshold value less than infinity). However, when the value of the time alignment timer is not equal to infinity as shown in line 3 of the algorithm 800, the UE 704 may set the value for the synchronization timer to the value of the time alignment timer as shown in line 4.

As shown in lines 6 and 7 of the algorithm 800, when the UE 704 transitions into a connected mode (e.g., the connection between the network entity 702 and the UE 704 is established), the UE 704 may start the synchronization timer. Thereafter, as shown in lines 9-12, when the UE 704 receives, from the network entity 702, at least one of a timing advance (TA) value, an uplink grant, or a downlink grant, the UE 704 may restart the synchronization timer as receiving a TA value, an uplink grant, or a downlink grant may indicate that the connection established between the network entity 702 and the UE 704 is still active and functioning correctly. Thereafter, as shown in lines 14 and 15, if the UE 704 transitions into an idle mode (e.g., the connection established between the network entity 702 and the UE 704 is dropped), the UE 704 may stop the synchronization timer.

Returning to FIG. 7A, in response to the synchronization request message, the one or more lower layers 710 of the UE 704 may send a synchronization response (sync confirm) message to the NAS layer 708 of the UE 704, as shown at 728, indicating or confirming that the synchronization timer is running. Accordingly, based on the synchronization response message, the NAS layer 708 of the UE 704 may determine that the synchronization timer is running, indicating that the connection between the network entity 702 and the UE 704 is still active.

As noted above, when the IMS Procedure Failure Reset Timer has expired before receiving an IMS response message from the network and when the synchronization response message indicates or confirms that the synchronization timer is running, this may indicate that there is a problem with the UE context for the UE 704 stored at the network entity 702 which is preventing the UE 704 from receiving the IMS response message. Accordingly, to help resolve this issue and refresh or reestablish the UE context, the NAS layer 708 of the UE 704 may perform, at 730, a NAS procedure with the network entity 702 based on the determination that the synchronization timer is running and based on the IMS Procedure Failure Reset Timer expiring prior to receiving an IMS response message. In some cases, the NAS procedure may include the UE 704 locally releasing the connection between the UE 704 and the network entity 702, performing at least one of a service request procedure or a tracking area update (TAU) procedure, and reestablishing a UE context based on the TAU procedure.

Thereafter, as shown at 732, after performing the NAS procedure, the IMS layer 706 of the UE 704 may transmit a fifth IMS SIP message to the network entity 702. However, as shown at 734, because the UE 704 has performed the NAS procedure and the UE context has been reestablished at the network entity 702, the UE 704 may finally receive the IMS response message from the IMS server via the network entity 702, allowing multimedia communication services over an IP network to be established and for the IMS registration procedure to be completed. It should be noted that while FIG. 7A illustrates the UE 704 sending five IMS SIP messages, the UE 704 may transmit fewer or more than five IMS SIP messages.

Figure 7B:
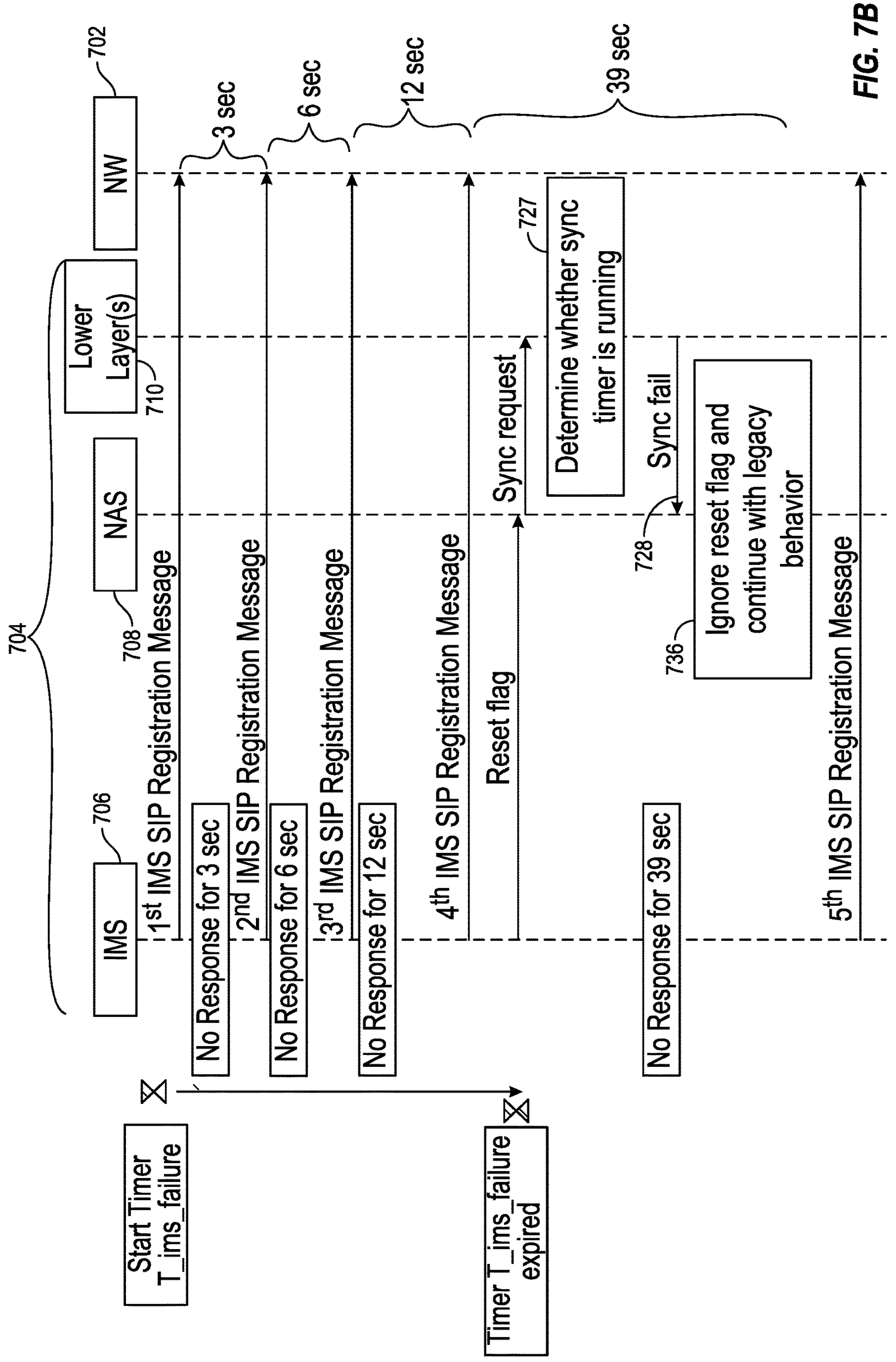
FIG. 7B depicts a process flow for communications in a network between the network entity and the user equipment.

In some cases, at 727, the UE 704 may determine, at the one or more lower layers 710, the synchronization timer has expired. As a result, as shown in FIG. 7B, the synchronization response message sent by the one or more lower layers 710 to the NAS layer 708 at 728 may indicate that the synchronization timer is no longer running (e.g., sync fail), which may indicate that there is an issue with the connection established between the network entity 702 and the UE 704. In this scenario, as shown at 736, the NAS layer 708 may ignore the reset flag from the IMS layer 706 (e.g., not perform the NAS procedure) and proceed with legacy behavior by performing one or more procedures to re-establish the connection between the network entity 702 and the UE 704.

Example Operations

Figure 9:
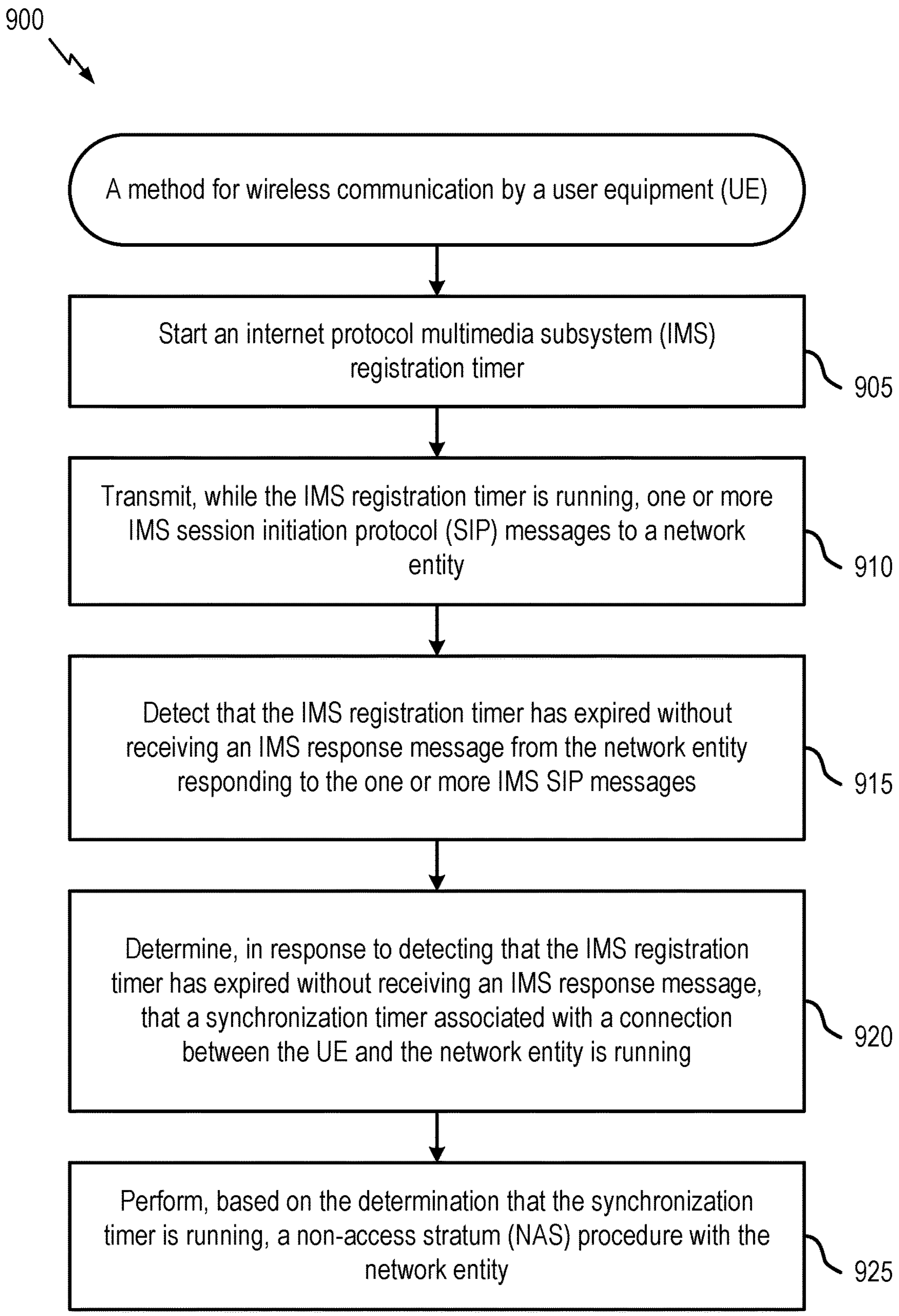
FIG. 9 depicts a method for wireless communications.

FIG. 9 shows an example of a method 900 of wireless communication by a user equipment (UE), such as a UE 104 of FIGS. 1 and 3.

Method 900 begins at step 905 with starting an internet protocol multimedia subsystem (IMS) registration timer. In some cases, the operations of this step refer to, or may be performed by, circuitry for starting and/or code for starting as described with reference to FIG. 10.

Method 900 then proceeds to step 910 with transmitting, while the IMS Procedure Failure Reset Timer is running, one or more IMS session initiation protocol (SIP) messages to a network entity. In some cases, the operations of this step refer to, or may be performed by, circuitry for transmitting and/or code for transmitting as described with reference to FIG. 10.

Method 900 then proceeds to step 915 with detecting that the IMS Procedure Failure Reset Timer has expired without receiving an IMS response message from the network entity responding to the one or more IMS SIP messages. In some cases, the operations of this step refer to, or may be performed by, circuitry for detecting and/or code for detecting as described with reference to FIG. 10.

Method 900 then proceeds to step 920 with determining, in response to detecting that the IMS Procedure Failure Reset Timer has expired without receiving an IMS response message, that a synchronization timer associated with a connection between the UE and the network entity is running. In some cases, the operations of this step refer to, or may be performed by, circuitry for determining and/or code for determining as described with reference to FIG. 10.

Method 900 then proceeds to step 925 with performing, based on the determination that the synchronization timer is running, a non-access stratum (NAS) procedure with the network entity. In some cases, the operations of this step refer to, or may be performed by, circuitry for performing and/or code for performing as described with reference to FIG. 10.

In some aspects, performing the NAS procedure includes: locally releasing the connection between the UE and the network entity; performing at least one of a service request procedure or a tracking area update (TAU) procedure; and reestablishing a UE context based on the TAU procedure.

In some aspects, the method 900 further includes sending a reset flag from an IMS layer of the UE to a NAS layer of the UE based on detecting that the IMS Procedure Failure Reset Timer has expired without receiving an IMS response message from network entity. In some cases, the operations of this step refer to, or may be performed by, circuitry for sending and/or code for sending as described with reference to FIG. 10.

In some aspects, the method 900 further includes sending a synchronization request message, from the NAS layer of the UE to one or more lower layers of the UE, inquiring whether the synchronization timer is running. In some cases, the operations of this step refer to, or may be performed by, circuitry for sending and/or code for sending as described with reference to FIG. 10.

In some aspects, the method 900 further includes sending a synchronization response message, from the one or more lower layers of the UE to the NAS layer of the UE, indicating that the synchronization timer is running, wherein the determining that the synchronization timer is running is based on the synchronization response message. In some cases, the operations of this step refer to, or may be performed by, circuitry for sending and/or code for sending as described with reference to FIG. 10.

In some aspects, the method 900 further includes receiving, based on performing the NAS procedure, the IMS response message from the network entity responding to the one or more IMS SIP messages. In some cases, the operations of this step refer to, or may be performed by, circuitry for receiving and/or code for receiving as described with reference to FIG. 10.

In some aspects, the method 900 further includes receiving, from the network entity, at least one of a timing advance (TA), an uplink grant, or a downlink grant. In some cases, the operations of this step refer to, or may be performed by, circuitry for receiving and/or code for receiving as described with reference to FIG. 10.

In some aspects, the method 900 further includes restarting the synchronization timer based on receiving at least one of the TA, the uplink grant, or the downlink grant. In some cases, the operations of this step refer to, or may be performed by, circuitry for restarting and/or code for restarting as described with reference to FIG. 10.

In some aspects, the method 900 further includes receiving configuration information from the network entity indicating a value for a timing advance (TA) timer. In some cases, the operations of this step refer to, or may be performed by, circuitry for receiving and/or code for receiving as described with reference to FIG. 10.

In some aspects, the value for the time alignment timer is infinity; and based on the value for the time alignment timer being infinity, the method further comprises setting a value for the synchronization timer to a value less than infinity.

In some aspects, the value for the time alignment timer is a value less than infinity; and based on the value for the time alignment timer being a value less than infinity, the method further comprises setting a value for the synchronization timer to the value for the time alignment timer.

In some aspects, the method 900 further includes receiving one or more acknowledgement messages from a radio access network (RAN) associated with the network entity acknowledging reception of the one or more IMS SIP messages. In some cases, the operations of this step refer to, or may be performed by, circuitry for receiving and/or code for receiving as described with reference to FIG. 10.

In some aspects, the one or more IMS SIP messages comprise one or more IMS SIP registration messages.

Figure 10:
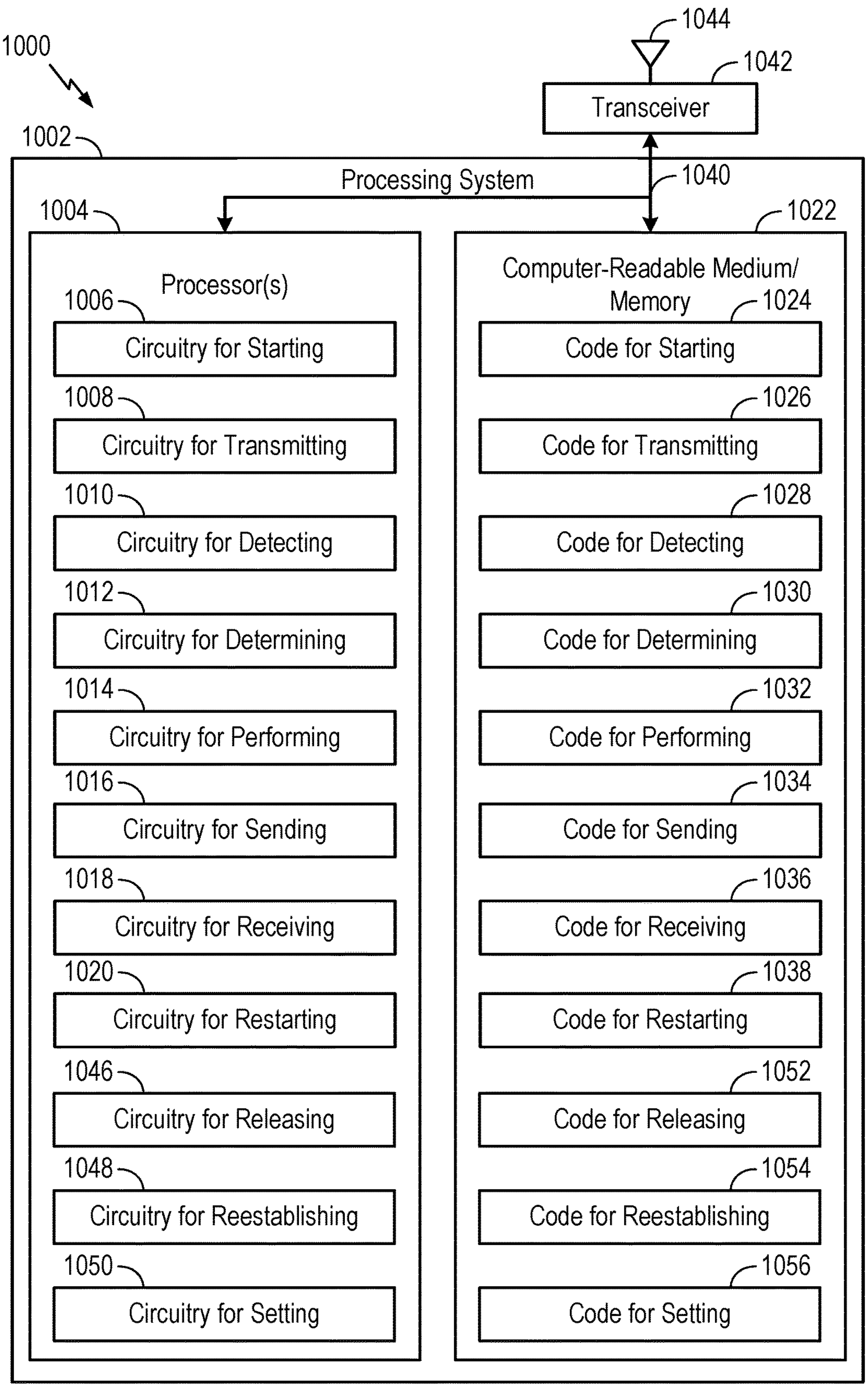
FIG. 10 depicts aspects of an example communications device.

In one aspect, method 900, or any aspect related to it, may be performed by an apparatus, such as communications device 1000 of FIG. 10, which includes various components operable, configured, or adapted to perform the method 900. Communications device 1000 is described below in further detail.

Note that FIG. 9 is just one example of a method, and other methods including fewer, additional, or alternative steps are possible consistent with this disclosure.

Example Communications Device(s)

FIG. 10 depicts aspects of an example communications device 1000. In some aspects, communications device 1000 is a user equipment, such as UE 104 described above with respect to FIGS. 1 and 3.

The communications device 1000 includes a processing system 1002 coupled to the transceiver 1042 (e.g., a transmitter and/or a receiver). The transceiver 1042 is configured to transmit and receive signals for the communications device 1000 via the antenna 1044, such as the various signals as described herein. The processing system 1002 may be configured to perform processing functions for the communications device 1000, including processing signals received and/or to be transmitted by the communications device 1000.

The processing system 1002 includes one or more processors 1004. In various aspects, the one or more processors 1004 may be representative of one or more of receive processor 358, transmit processor 364, TX MIMO processor 366, and/or controller/processor 380, as described with respect to FIG. 3. The one or more processors 1004 are coupled to a computer-readable medium/memory 1022 via a bus 1040. In certain aspects, the computer-readable medium/memory 1022 is configured to store instructions (e.g., computer-executable code) that when executed by the one or more processors 1004, cause the one or more processors 1004 to perform the method 900 described with respect to FIG. 9, or any aspect related to it. Note that reference to a processor performing a function of communications device 1000 may include one or more processors 1004 performing that function of communications device 1000.

In the depicted example, computer-readable medium/memory 1022 stores code (e.g., executable instructions), such as code for starting 1024, code for transmitting 1026, code for detecting 1028, code for determining 1030, code for performing 1032, code for sending 1034, code for receiving 1036, code for restarting 1038, code for releasing 1052, code for reestablishing 1054, and code for setting 1056. Processing of the code for starting 1024, code for transmitting 1026, code for detecting 1028, code for determining 1030, code for performing 1032, code for sending 1034, code for receiving 1036, code for restarting 1038, code for releasing 1052, code for reestablishing 1054, and code for setting 1056 may cause the communications device 1000 to perform the method 900 described with respect to FIG. 9, or any aspect related to it.

The one or more processors 1004 include circuitry configured to implement (e.g., execute) the code stored in the computer-readable medium/memory 1022, including circuitry such as circuitry for starting 1006, circuitry for transmitting 1008, circuitry for detecting 1010, circuitry for determining 1012, circuitry for performing 1014, circuitry for sending 1016, circuitry for receiving 1018, circuitry for restarting 1020, circuitry for releasing 1046, circuitry for reestablishing 1048, and circuitry for setting 1050. Processing with circuitry for starting 1006, circuitry for transmitting 1008, circuitry for detecting 1010, circuitry for determining 1012, circuitry for performing 1014, circuitry for sending 1016, circuitry for receiving 1018, circuitry for restarting

1020, circuitry for releasing 1046, circuitry for reestablishing 1048, and circuitry for setting 1050 may cause the communications device 1000 to perform the method 900 described with respect to FIG. 9, or any aspect related to it.

Various components of the communications device 1000 may provide means for performing the method 900 described with respect to FIG. 9, or any aspect related to it. For example, means for transmitting, sending or outputting for transmission may include transceivers 354 and/or antenna(s) 352 of the UE 104 illustrated in FIG. 3 and/or the transceiver 1042 and the antenna 1044 of the communications device 1000 in FIG. 10. Means for receiving or obtaining may include transceivers 354 and/or antenna(s) 352 of the UE 104 illustrated in FIG. 3 and/or the transceiver 1042 and the antenna 1044 of the communications device 1000 in FIG. 10.

Example Clauses

Implementation examples are described in the following numbered clauses:

Clause 1: A method for wireless communication by a user equipment (UE), comprising: starting an internet protocol multimedia subsystem (IMS) registration timer; transmitting, while the IMS Procedure Failure Reset Timer is running, one or more IMS session initiation protocol (SIP) messages to a network entity; detecting that the IMS Procedure Failure Reset Timer has expired without receiving an IMS response message from the network entity responding to the one or more IMS SIP messages; determining, in response to detecting that the IMS Procedure Failure Reset Timer has expired without receiving an IMS response message, that a synchronization timer associated with a connection between the UE and the network entity is running; and performing, based on the determination that the synchronization timer is running, a non-access stratum (NAS) procedure with the network entity.

Clause 2: The method of Clause 1, wherein performing the NAS procedure includes: locally releasing the connection between the UE and the network entity; performing at least one of a service request procedure or a tracking area update (TAU) procedure; and reestablishing a UE context based on the TAU procedure.

Clause 3: The method of any one of Clauses 1-2, further comprising and sending a reset flag from an IMS layer of the UE to a NAS layer of the UE based on detecting that the IMS Procedure Failure Reset Timer has expired without receiving an IMS response message from network entity.

Clause 4: The method of Clause 3, further comprising and sending a synchronization request message, from the NAS layer of the UE to one or more lower layers of the UE, inquiring whether the synchronization timer is running.

Clause 5: The method of Clause 4, further comprising and sending a synchronization response message, from the one or more lower layers of the UE to the NAS layer of the UE, indicating that the synchronization timer is running, wherein the determining that the synchronization timer is running is based on the synchronization response message.

Clause 6: The method of any one of Clauses 1-5, further comprising and receiving, based on performing the NAS procedure, the IMS response message from the network entity responding to the one or more IMS SIP messages.

Clause 7: The method of any one of Clauses 1-6, further comprising: receiving, from the network entity, at least one of a timing advance (TA), an uplink grant, or a downlink grant; and restarting the synchronization timer based on receiving at least one of the TA, the uplink grant, or the downlink grant.

Clause 8: The method of any one of Clauses 1-7, further comprising and receiving configuration information from the network entity indicating a value for a timing advance (TA) timer.

Clause 9: The method of Clause 8, wherein: the value for the time alignment timer is infinity; and based on the value for the time alignment timer being infinity, the method further comprises setting a value for the synchronization timer to a value less than infinity.

Clause 10: The method of Clause 9, wherein: the value for the time alignment timer is a value less than infinity; and based on the value for the time alignment timer being a value less than infinity, the method further comprises setting a value for the synchronization timer to the value for the time alignment timer.

Clause 11: The method of any one of Clauses 1-10, further comprising and receiving one or more acknowledgement messages from a radio access network (RAN) associated with the network entity acknowledging reception of the one or more IMS SIP messages.

Clause 12: The method of any one of Clauses 1-11, wherein the one or more IMS SIP messages comprise one or more IMS SIP registration messages.

Clause 13: An apparatus, comprising: one or more processors, individually or collectively, configured to execute instructions stored on one or more memories and to cause the apparatus to perform a method in accordance with any one of Clauses 1-12.

Clause 14: An apparatus, comprising means for performing a method in accordance with any one of Clauses 1-12.

Clause 15: A non-transitory computer-readable medium comprising executable instructions that, when executed by one or more processors of an apparatus, cause the apparatus to perform a method in accordance with any one of Clauses 1-12.

Clause 16: A computer program product embodied on a computer-readable storage medium comprising code for performing a method in accordance with any one of Clauses 1-12.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE), comprising:

starting an internet protocol multimedia subsystem (IMS) procedure failure reset timer;

transmitting, while the IMS Procedure Failure Reset Timer is running, one or more IMS session initiation protocol (SIP) messages to a network entity;

detecting that the IMS Procedure Failure Reset Timer has expired without receiving an IMS response message from the network entity responding to the one or more IMS SIP messages;

determining, in response to detecting that the IMS Procedure Failure Reset Timer has expired without receiving an IMS response message, that a synchronization timer associated with a connection between the UE and the network entity is running;

performing, based on the determination that the synchronization timer is running, a non-access stratum (NAS) procedure with the network entity; and receiving, based on performing the NAS procedure, the IMS response message from the network entity responding to the one or more IMS SIP messages.

2. The method of claim 1, wherein performing the NAS procedure includes:

locally releasing the connection between the UE and the network entity;

performing at least one of a service request procedure or at least one of a service request procedure or a tracking area update (TAU) procedure; and reestablishing a UE context based on the at least one of the service request procedure or the TAU procedure.

3. The method of claim 1, further comprising sending a reset flag from an IMS layer of the UE to a NAS layer of the UE based on detecting that the IMS Procedure Failure Reset Timer has expired without receiving an IMS response message from network entity.

4. The method of claim 3, further comprising sending a synchronization request message, from the NAS layer of the UE to one or more lower layers of the UE, inquiring whether the synchronization timer is running.

5. The method of claim 4, further comprising sending a synchronization response message, from the one or more lower layers of the UE to the NAS layer of the UE, indicating that the synchronization timer is running, wherein the determining that the synchronization timer is running is based on the synchronization response message.

6. The method of claim 1, further comprising:

receiving, from the network entity, at least one of a timing advance (TA), an uplink grant, or a downlink grant; and restarting the synchronization IMS Procedure Failure Reset Timer based on receiving at least one of the TA, the uplink grant, or the downlink grant.

7. The method of claim 1, further comprising receiving configuration information from the network entity indicating a value for a time alignment timer.

8. The method of claim 7, wherein:

the value for the time alignment timer is infinity; and based on the value for the time alignment timer being infinity, the method further comprises setting a value for the synchronization timer to a value less than infinity.

9. The method of claim 8, wherein:

the value for the time alignment timer is a value less than infinity; and based on the value for the time alignment timer being a value less than infinity, the method further comprises setting a value for the synchronization to the value for the time alignment timer.

10. The method of claim 1, further comprising receiving one or more acknowledgement messages from a radio access network (RAN) associated the network entity acknowledging reception of the one or more IMS SIP messages.

11. The method of claim 1, wherein the one or more IMS SIP messages comprise one or more IMS SIP registration messages.

12. An apparatus for wireless communication at a user equipment (UE), comprising:

one or more processors individually or collectively configured to execute instructions stored on one or more memories and to cause the UE to:

start an internet protocol multimedia subsystem (IMS) procedure failure reset timer;

transmit, while the IMS Procedure Failure Reset Timer is running, one or more IMS session initiation protocol (SIP) messages to a network entity;

detect that the IMS Procedure Failure Reset Timer has expired without receiving an IMS response message from the network entity responding to the one or more IMS SIP messages;

determine, in response to detecting that the IMS Procedure Failure Reset Timer has expired without receiving an IMS response message, that a synchronization timer associated with a connection between the UE and the network entity is running;

perform, based on the determination that the synchronization timer is running, a non-access stratum (NAS) procedure with the network entity; and receive configuration information from the network entity indicating a value for a time alignment timer.

13. The apparatus of claim 12, wherein, in order to perform the NAS procedure, the one or more processors are further configured to cause the UE to:

locally release the connection between the UE and the network entity;

perform at least one of a service request procedure or at least one of a service request procedure or a tracking area update (TAU) procedure; and reestablish a UE context based on the at least one of the service request procedure or the TAU procedure.

14. The apparatus of claim 12, wherein the one or more processors are further configured to cause the UE to send a reset flag from an IMS layer of the UE to a NAS layer of the UE based on detecting that the IMS Procedure Failure Reset Timer has expired without receiving an IMS response message from network entity.

15. The apparatus of claim 14, wherein the one or more processors are further configured to cause the UE to send a synchronization request message, from the NAS layer of the UE to one or more lower layers of the UE, inquiring whether the synchronization timer is running.

16. The apparatus of claim 15, wherein:

the one or more processors are further configured to cause the UE to send a synchronization response message, from the one or more lower layers of the UE to the NAS layer of the UE, indicating that the synchronization timer is running, and the one or more processors are further configured to cause the UE to determine that the synchronization timer is running based on the synchronization response message.

17. The apparatus of claim 12, wherein the one or more processors are further configured to cause the UE to receive, based on performing the NAS procedure, the IMS response message from the network entity responding to the one or more IMS SIP messages.

18. The apparatus of claim 12, wherein the one or more processors are further configured to cause the UE to:

receive, from the network entity, at least one of a timing advance (TA), an uplink grant, or a downlink grant; and restart the synchronization IMS Procedure Failure Reset Timer based on receiving at least one of the TA, the uplink grant, or the downlink grant.

19. The apparatus of claim 12, wherein:

the value for the time alignment timer is infinity; and based on the value for the time alignment timer being infinity, the one or more processors are further configured to cause the UE to set a value for the synchronization timer to a value less than infinity.

20. The apparatus of claim 19, wherein:

the value for the time alignment timer is a value less than infinity; and based on the value for the time alignment timer being a value less than infinity, the one or more processors are further configured to cause the UE to set a value for the synchronization to the value for the time alignment timer.

21. The apparatus of claim 12, wherein the one or more processors are further configured to cause the UE to receive one or more acknowledgement messages from a radio access network (RAN) associated the network entity acknowledging reception of the one or more IMS SIP messages.

22. The apparatus of claim 12, wherein the one or more IMS SIP messages comprise one or more IMS SIP registration messages.

23. An apparatus for wireless communication at a user equipment (UE), comprising:

means for starting an internet protocol multimedia subsystem (IMS) procedure failure reset timer;

means for transmitting, while the IMS Procedure Failure Reset Timer is running, one or more IMS session initiation protocol (SIP) messages to a network entity;

means for detecting that the IMS Procedure Failure Reset Timer has expired without receiving an IMS response message from the network entity responding to the one or more IMS SIP messages;

means for determining, in response to detecting that the IMS Procedure Failure Reset Timer has expired without receiving an IMS response message, that a synchronization timer associated with a connection between the UE and the network entity is running;

means for performing, based on the determination that the synchronization timer is running, a non-access stratum (NAS) procedure with the network entity; and means for receiving, based on performing the NAS procedure, the IMS response message from the network entity responding to the one or more IMS SIP messages.

24. The apparatus of claim 23, wherein the means for performing the NAS procedure includes:

means for locally releasing the connection between the UE and the network entity;

means for performing at least one of a service request procedure or at least one of a service request procedure or a tracking area update (TAU) procedure; and means for reestablishing a UE context based on the at least one of the service request procedure or the TAU procedure.

25. The apparatus of claim 23, further comprising:

means for receiving, from the network entity, at least one of a timing advance (TA), an uplink grant, or a downlink grant; and means for restarting the synchronization IMS Procedure Failure Reset Timer based on receiving at least one of the TA, the uplink grant, or the downlink grant.

26. A non-transitory computer-readable medium for wireless communication at a user equipment (UE), comprising:

instructions that, when executed by one or more processors of the apparatus, cause the UE to:

start an internet protocol multimedia subsystem (IMS) procedure failure reset timer;

transmit, while the IMS Procedure Failure Reset Timer is running, one or more IMS session initiation protocol (SIP) messages to a network entity;

detect that the IMS Procedure Failure Reset Timer has expired without receiving an IMS response message from the network entity responding to the one or more IMS SIP messages;

determine, in response to detecting that the IMS Procedure Failure Reset Timer has expired without receiving an IMS response message, that a synchronization timer associated with a connection between the UE and the network entity is running; and perform, based on the determination that the synchronization timer is running, a non-access stratum (NAS) procedure with the network entity; and receive configuration information from the network entity indicating a value for a time alignment timer.

27. The non-transitory computer-readable medium of claim 26, wherein the instructions further cause the UE to:

locally release the connection between the UE and the network entity;

perform at least one of a service request procedure or at least one of a service request procedure or a tracking area update (TAU) procedure; and reestablish a UE context based on the at least one of the service request procedure or the TAU procedure.

28. The non-transitory computer-readable medium of claim 26, wherein the instructions further cause the UE to:

receive, from the network entity, at least one of a timing advance (TA), an uplink grant, or a downlink grant; and restart the synchronization IMS Procedure Failure Reset Timer based on receiving at least one of the TA, the uplink grant, or the downlink grant.

* * * * *